Patented June 21, 1938

2,121,016

UNITED STATES PATENT OFFICE 2,121,016

AZO DYES DERIVED FROM BETA-NAPHTHOL

Troy Lee Cantrell, Lansdowne, Pa., and James Otho Turner, Bartlesville, Okla., assignors to Gulf Oil Corporation, Pittsburgh, Pa., a corporation of Pennsylvania No Drawing. Application September 2, 1936, Serial No. 99,161. Renewed March 21, 1938

6 Claims. (Cl. 260—91)

This invention relates to azo dyes derived from beta-naphthol and it comprises yellow azo dyes useful for improving and coloring petroleum products such as gasoline, kerosene, mineral lubricating oils, specialty oils, etc., such dyes being mono-azo compounds wherein the beta-naphthol is coupled by the azo group to an ortho-substituted phenyl ether, advantageously a nitrophenyl alkyl ether, and it also comprises methods of making such dyes wherein an alkyl ether of a nitroaminobenzene is diazotized and coupled with beta-naphthol to form a yellow dye soluble in petroleum products; all as more fully hereinafter set forth and as claimed.

In our companion applications, Serial Nos. 99,159 and 99,158, filed Sept. 2, 1936, we describe and claim certain improved petroleum products, such as mineral lubricating oils, gasoline, etc., containing a minor amount of a beta-naphthol azo nitrophenyl ether and the methods of producing such improved compositions; the two applications being directed to thioethers and oxy-ethers, respectively.

The present invention relates to the manufacture of these beta-naphthol azo compounds and includes such mono-azo dyes and methods of making the same.

These beta-naphthol mono-azo-nitro ethers in addition to being useful as improvement agents for petroleum products are generally useful for other purposes.

This new class of mono-azo compounds may be represented by the following formula:—

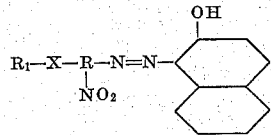

wherein R represents an aryl group and $R_1$ represents an organic radical, the para position of R with respect to the ether group being occupied by a nitrogen substituent, either the nitro or azo group. Advantageously R and $R_1$ may be phenylene and alkyl groups respectively. Those in which $R_1$ is an alkyl group are advantageous improvement agents for mineral and other oils.

These dyes are oil-soluble, but are substantially insoluble in water. They are generally soluble in hydrocarbons and in alcohols.

In our companion application, Serial No. 98,828, filed Aug. 31, 1936, we describe and claim the production of new aryl ether compounds by condensing nitro-chlorbenzenes with metallo-organic compounds such as alkali metal mercaptides and alcoholates. Of those new aryl ethers, the nitro-amino aryl ethers are useful for the present purposes. They may be represented by the following formula:—

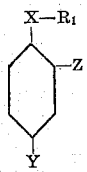

wherein X is O or S, and Y and Z each represent a nitro or an amino group, one of each being present.

The following nitro-amino ethers are typical of those which we have found to be advantageous in the manufacture of beta-naphthol azo compounds and they are given as illustrative of the present invention and not by way of limitation:

Ethyl oxy-ether of ortho-amino-para-nitro benzene
Propyl oxy-ether of ortho-amino-para-nitro benzene
Butyl oxy-ether of ortho-amino-para-nitro benzene
Amyl oxy-ether of ortho-amino-para-nitro benzene
Ethyl thioether of para-amino-ortho-nitro benzene
Propyl thioether of para-amino-ortho-nitro benzene
Butyl thioether of para-amino-ortho-nitro benzene
Amyl thioether of para-amino-ortho-nitro benzene
Phenyl thioether of para-amino-ortho-nitro benzene
Phenyl oxy-ether of para-amino-ortho-nitro benzene The 3-nitro-4-thioethyl phenylamine and the 2-ethoxy-5-nitro phenylamine when diazotized and coupled with beta-naphthol yield particularly advantageous mono-azo dyes.

In preparing the azo dyes the amino ether is diazotized and then coupled with the beta-naphthol. Usually the amino-nitro ether, either the thioether or oxy-ether, is mixed with a molar amount of dilute hydrochloric acid and the solution is cooled to about 40° F. To the cooled solution one molar equivalent of sodium nitrite, dissolved in water, is added. The nitrite is gradually added, the mixture being maintained at 40° F. by cooling.

After the diazotization reaction is complete, the coupling with the naphthol is effected. In this operation, sufficient beta-naphthol to combine with the azo compound is dissolved in aqueous caustic soda solution and the solution so obtained is cooled to below 40° F.

The cool mixture containing the diazonium chloride is then slowly added to this pre-cooled solution. During the coupling, the reaction mixture is maintained at the said temperature and vigorously stirred during the mixing of the solutions. The mixture is further stirred until the coupling is substantially complete.

These nitrophenyl thioether azo dyes, being insoluble in water are precipitated as formed. By filtering the mixture the crystalline dyestuff is recovered. It may be washed with acidulated water to remove the adhering reaction liquor and sodium chloride. The washed crystals may be air dried.

The azo dyes so obtained range in color from light yellow to brilliant orange, depending upon the substituent group attached to the ether linkage and upon whether the compound is a thioether or an oxy-ether. These azo compounds color or dye various materials in similar shades. The coloring produced is substantially permanent as these azo compounds are relatively resistant to deteriorative change by light or oxidation as customarily encountered when such dyed materials are subjected to atmospheric conditions or to the ordinary conditions under which they are used.

The alkyl thioethers of para-nitro azo beta-naphthol are advantageous dyes. They may be represented by the following formula:—

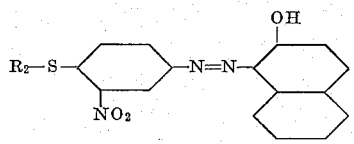

wherein $R_2$ represents an alkyl group.

The alkyl alkoxy ethers of para-nitro beta-naphthol are also advantageous dyes. They may be represented by the following formula:—

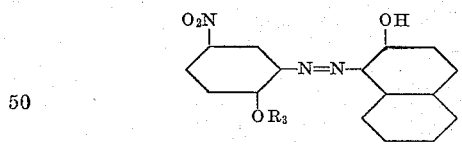

wherein $R_3$ represents the alkyl group.

In our said application, Serial No. 98,826, filed Aug. 31, 1936, we have shown that generally alkyl ethers having a nitrogen-containing substituent in the benzene nucleus, such as nitro, amino, or azo groups in the positions ortho or para to the ether group thereof are advantageous as improvement agents for mineral oils. The azo dyes of the present invention contain similar structural characteristics in addition to having a naphthol group present and they are useful in improving mineral lubricating oils.

That is, these azo compounds are advantageous addition agents for petroleum products such as mineral oils, including lubricating oil, special oil, and gasoline, kerosene, etc. The thioethers are particularly advantageous for this purpose as they contain combined sulfur in the "sulfide" form.

The azo compounds also impart a distinctive color to the petroleum composition, thus readily distinguishing it from other petroleum products. In this way the improved composition may be identified by visual inspection from the base petroleum composition employed in making it.

Also, the presence of the beta-naphthol group in these azo dyes is advantageous as pointed out in Serial No. 98,828. Naphthol itself has been used as an improvement agent for cracked gasolines, the function of the beta-naphthol group being to inhibit deteriorative changes by oxidation, etc. in the gasoline.

The specific examples given post are expositive of some particular embodiments of the present invention, and they are presented by way of illustration thereof and not by way of limitation. In these examples the parts given are parts by weight.

*Example 1.*—In preparing the 3-nitro-4-thioethyl phenyl azo beta-naphthol, 209 pounds of the ethyl thioether of para-nitro-ortho-amino benzene are dissolved in 2000 pounds of dilute hydrochloric acid, commercial acid containing 3.6 per cent hydrogen chloride. The mixture is cooled to about 40° F. To the cooled mixture, there is gradually added 700 pounds of an aqueous solution of sodium nitrite containing 70 pounds of sodium nitrite. During this time the mixture is thoroughly agitated and maintained at said temperature by suitable cooling means. After all the nitrite has been added this mixture is further agitated until the diazotization has been completed, about eight hours being required. The diazotized thioether so obtained is then coupled with beta-naphthol by the procedure given ante in this specification, to produce the 3-nitro-4-thioethyl phenyl azo beta-naphthol.

*Example 2.*—In preparing the 1-ethoxy-4-nitro-phenyl azo beta-naphthol, 193 pounds of the ethyl oxy-ether of para-nitro-ortho-amino benzene are dissolved in 2000 pounds of dilute hydrochloric acid, commercial acid containing 3.6 per cent hydrogen chloride. The mixture is cooled to about 40° F. To the cooled mixture, there is gradually added 700 pounds of an aqueous solution of sodium nitrite containing 70 pounds of sodium nitrite. During this time the mixture is thoroughly agitated and maintained at said temperature by suitable cooling means. After all the nitrite has been added this mixture is further agitated until the diazotization has been completed, about eight hours being required. The diazotized ether so obtained is then coupled with beta-naphthol by the procedure given ante, to produce the 1-ethoxy-4-nitro phenyl-2-azo beta-naphthol.

In our copending application Serial No. 124,513, filed Feb. 6, 1937, we describe and claim the beta-naphthol-azo-nitrophenyl oxy-ethers and methods of preparing the same, the said application being a division of the present application.

What we claim is:

1. In the manufacture of improved beta-naphthol azo dyes, the improvement which comprises coupling beta-naphthol with a diazotized nitro-amyl phenyl alkyl thioether having the following formula

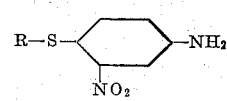

wherein R is an alkyl group.

2. The process of claim 1 wherein said ether is an ethyl ether.

3. The process of claim 1 wherein said ether is an amyl ether.

4. As an improved azo dye, the alkyl thioethers of 2-nitro-phenyl-4-azo beta-naphthol.

5. The dye of claim 4 wherein said thioether compound is an ethyl thioether.

6. As a new beta-naphthol azo dye having yellow to orange color, a beta-naphthol azo nitro phenyl alkyl thio ether, said dye being oil-soluble, soluble in alcohol but insoluble in water and capable of withstanding exposure to direct sunlight for at least ten hours without substantial bleaching when dissolved in petroleum products.

TROY LEE CANTRELL.
JAMES OTHO TURNER.